United States Patent [19]
Taleyarkhan

[11] Patent Number: 4,759,912
[45] Date of Patent: Jul. 26, 1988

[54] BWR FUEL ASSEMBLY HAVING HYBRID FUEL DESIGN

[75] Inventor: Rusi P. Taleyarkhan, Plum Borough, Pa.

[73] Assignee: Westinghouse Electric Corp., Pittsburgh, Pa.

[21] Appl. No.: 939,929

[22] Filed: Dec. 9, 1986

[51] Int. Cl.[4] ............................................... G21C 3/30
[52] U.S. Cl. ..................................... 376/435; 376/432; 376/444
[58] Field of Search ................ 376/435, 444, 448, 432, 376/437, 428

[56] References Cited

U.S. PATENT DOCUMENTS

| | | | |
|---|---|---|---|
| 2,852,458 | 9/1958 | Dietrich et al. | 376/339 |
| 2,938,848 | 5/1960 | Ladd et al. | 204/193.2 |
| 3,042,598 | 7/1962 | Crowther | 376/172 |
| 3,147,191 | 9/1964 | Crowther | 376/172 |
| 3,215,606 | 11/1965 | Silvester | 376/399 |
| 3,317,399 | 5/1967 | Winders | 376/435 |
| 4,076,586 | 2/1978 | Bideau et al. | 376/364 |
| 4,143,276 | 3/1979 | Mollon | 376/272 |
| 4,400,347 | 8/1983 | Fredin et al. | 376/333 |
| 4,560,532 | 12/1985 | Barry et al. | 376/434 |
| 4,610,893 | 9/1986 | Eriksson et al. | 376/272 |
| 4,666,664 | 5/1987 | Doshi | 376/444 |

FOREIGN PATENT DOCUMENTS 0072327  2/1983  European Pat. Off. ............ 376/435

Primary Examiner—Deborah L. Kyle
Assistant Examiner—Daniel Wasil

[57] ABSTRACT

A BWR fuel assembly has a hybrid fuel design composed of both rod-type fuel and plate-type fuel. An outer hollow tubular flow channel of the assembly surrounds the rod-type fuel being provided in the form of a plurality of fuel rods so as to direct flow of coolant/moderator fluid therealong. The assembly also includes a hollow central water cross extending through the channel and composed of radially extending panels dividing the fuel rods into separate fuel rod mini-bundles. The plate-type fuel is attached on the exterior of the water cross panels. This hybrid fuel design substantially avoids PCI constraints and failures.

14 Claims, 5 Drawing Sheets

BWR FUEL ASSEMBLY HAVING HYBRID FUEL DESIGN

BACKGROUND OF THE INVENTION

1. Field of the Invention

The present invention relates generally to nuclear reactor fuel assemblies and, more particularly, is concerned with a boiling water nuclear reactor (BWR) fuel assembly containing nuclear fuel in a hybrid design for elimination of pellet cladding interaction (PCI) constraints and minimization of PCI failures.

2. Description of the Prior Art

Typically, large amounts of energy are released through nuclear fission in a nuclear reactor with the energy being dissipated as heat in the elongated fuel elements or rods of the reactor. The heat is commonly removed by passing a coolant in heat exchange relation to the fuel rods so that the heat can be extracted from the coolant to perform useful work.

In a nuclear reactor generally, a plurality of the fuel rods are grouped together to form a fuel assembly. A number of such fuel assemblies are typically arranged in a matrix to form a nuclear reactor core capable of a self-sustained, nuclear fission reaction. The core is submersed in a flowing liquid, such as light water, that serves as the coolant for removing heat from the fuel rods and as a neutron moderator.

In a typical boiling water reactor (BWR) fuel assembly, a bundle of fuel rods in a N by N array are subdivided into four separate mini-bundles by a central water cross and each mini-bundle is supported in laterally spaced-apart relation by a plurality of spacers axially spaced apart along its fuel rods. Then, all four mini-bundles of the fuel assembly are encircled by an outer tubular channel having a generally rectangular cross-section. The outer flow channel extends along substantially the entire length of the fuel assembly and interconnects a top nozzle with a bottom nozzle. The bottom nozzle fits into the reactor core support plate and serves as an inlet for coolant flow into the outer channel of the fuel assembly. Coolant enters through the bottom nozzle and thereafter flows along the fuel rods removing energy from their heated surfaces. Such BWR fuel assembly is illustrated and described in U.S. Pat. No. 4,560,532 to Barry et al.

Operation of reactors at high power density across the core is desired from the standpoint of operating efficiency. There are, however, practical limits on the power density which can be maintained. These limits are essentially two: namely, fuel and reactor structural material temperature limits, and coolant fluid temperature and pressure limits. One consequence of operating the reactor core so as to approach any of these limits in any region of the core is that the problem of fuel pellet clad interaction (PCI) can arise resulting in possible failure of the clad and chemical reaction of the clad or the fuel with the coolant. This and related problems, as well as some solutions to these problems proposed heretofore, are discussed in detail in U.S. Pat. No. 3,147,191 to Crowther.

The need for avoiding PCI related fuel failures has recently prompted BWR fuel manufacturers to increase the number of fuel rods in a fuel assembly, thereby decreasing the power generated per rod. However, in the case of the BWR fuel assembly described above, increasing the 4×4 fuel rod array in each fuel mini-bundle to a 5×5 array leads to a drastic reduction in the bundle inlet orificing for hydraulic compatibility with existing BWR reload fuel. This leads to unaccepted degradation in the stability performance of the 5×5 array. It arises for the resulting fuel due to the presence of increased wetted area from the water cross in comparison to other BWR fuel assemblies having conventional open lattice fuel designs. The wetted area from the water cross refers to the additional flow frictional area due to the cold walls within the fuel assembly.

Consequently, a need exists for a technique to improve BWR fuel design so as to avoid the potential PCI constraints and failures, but without, at the same time, producing other unacceptable side effects.

SUMMARY OF THE INVENTION

The present invention provides features which are designed to satisfy the aforementioned needs. The present invention provides a solution to the PCI problem in the above-described BWR fuel assembly which involves retaining the same 8×8 fuel geometry (that is, 4×4 fuel in each of the four mini-bundles) but distributing the power generation between the existing sixty-four fuel rods and the radial panels of the water cross. This solution envisions a hybrid fuel design composed of a rod-type fuel, similar to that used heretofore, together with a plate-type fuel on the water cross panels. Such an arrangement provides reduced power generation per each fuel rod and fuel plate and leads to a hydraulically stable fuel bundle, simultaneously minimizing/eliminating the PCI problem. This hybrid approach to fuel design transforms a relative disadvantage (i.e., wetted surface due to unheated water cross panels in the present design) into a sizable advantage for overcoming the PCI-related fuel failure problem.

Accordingly, the present invention is set forth in a nuclear fuel assembly which includes an outer hollow tubular flow channel for directing the flow of coolant/moderator fluid through the fuel assembly and a hollow water cross extending through the channel and attached along the interior of the channel so as to divide it into a plurality of separate compartments and provide a central hollow channel for flow of coolant/moderator fluid through the fuel assembly. The present invention is directed to a hybrid fuel design comprising: (a) cladded rod-type nuclear fuel located within the compartments spaced from the outer channel and the water cross; and (b) cladded plate-type nuclear fuel attached on the exterior of the water cross.

More particularly, the hybrid fuel design comprises: (a) a plurality of elongated fuel rods located within the compartments between the interior of the outer flow channel and exterior of radially extending members of the water cross; and (b) a plurality of elongated fuel plates attached on the exterior of the water cross members. The fuel plates are generally coextensive in length with the fuel rods, and generally coextensive in width with the water cross members but shorter in length than the members. Still further, each fuel plate includes an inner sheet of nuclear fuel disposed adjacent the exterior of each of the water cross members, and an outer sheet of cladding disposed adjacent the exterior of the inner sheet. The outer sheet of cladding has a periphery attached to the water cross members so as to sealably enclose the inner sheet of nuclear fuel.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

Figure 1:
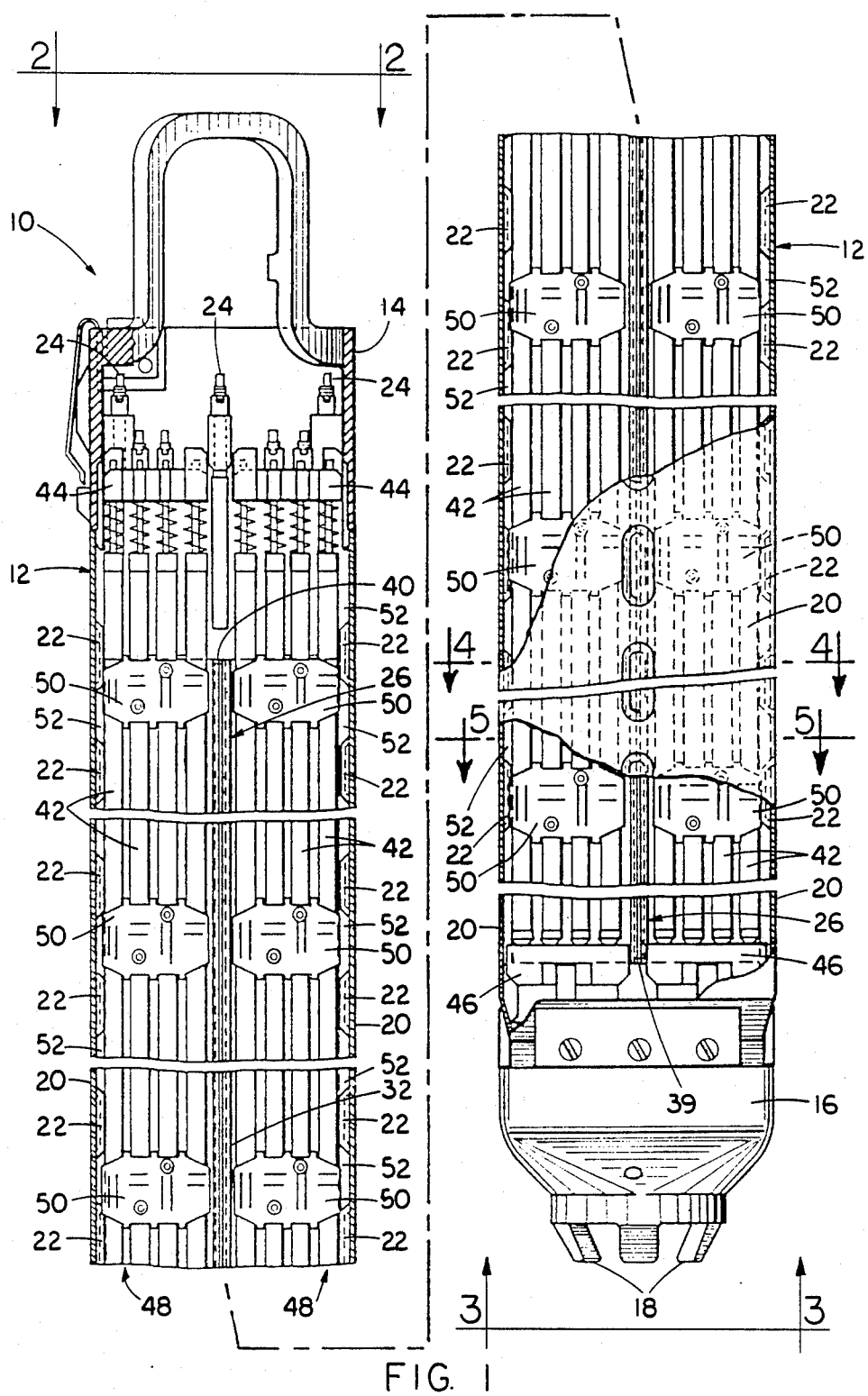
FIG. 1 is an elevational view, in vertically foreshortened form with parts broken away and sectioned for clarity, of a BWR nuclear fuel assembly.

In the following description, like reference characters designate like or corresponding parts throughout the several views of the drawings. Also in the following description, it is to be understood that such terms as "forward", "rearward", "left", "right", "upwardly", "downwardly", and the like are words of convenience and are not to be construed as limiting terms.

In General

Figure 2:
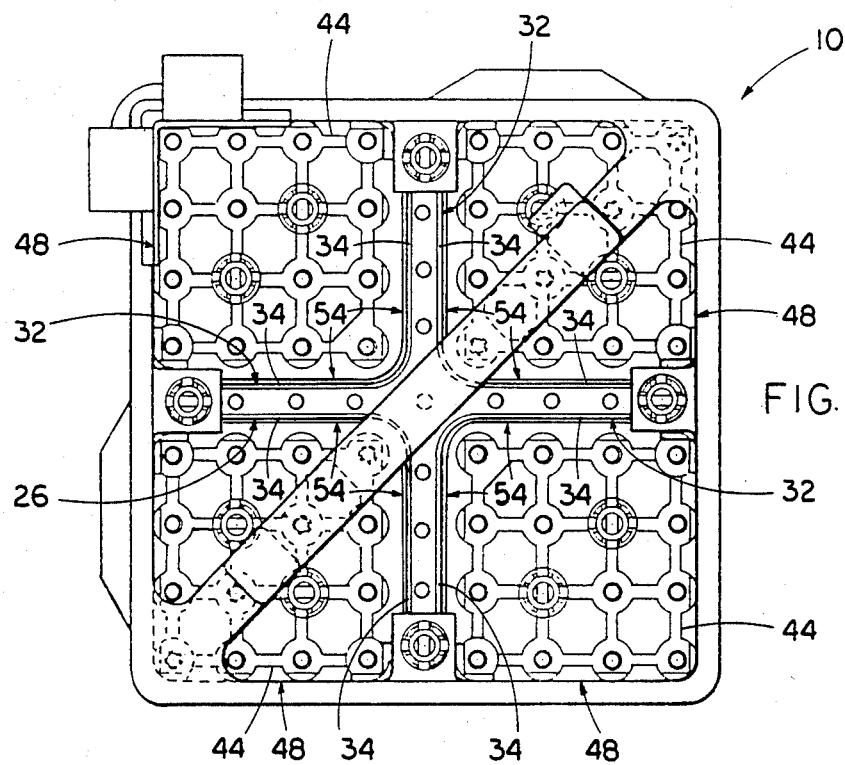
FIG. 2 is an enlarged top plan view of the fuel assembly as seen along line 2—2 of FIG. 1.
Figure 3:
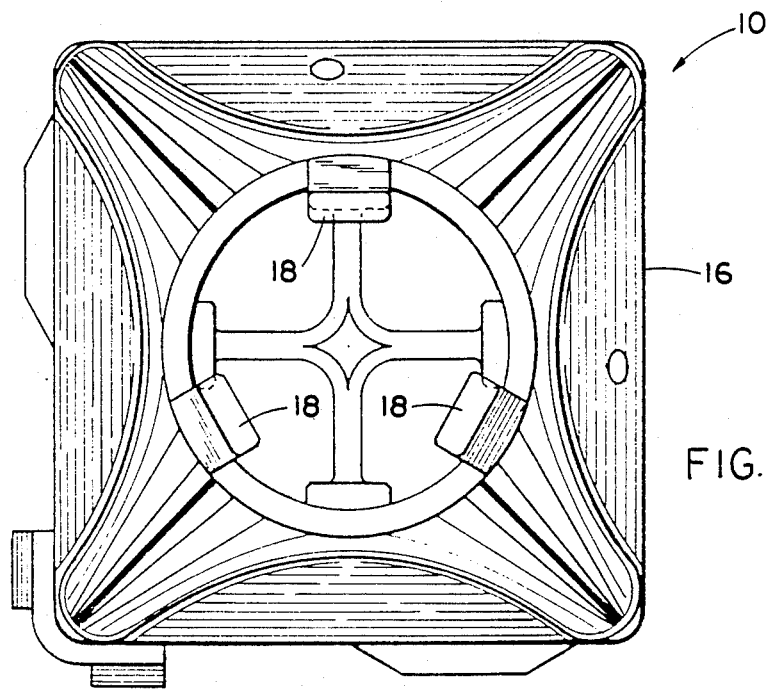
FIG. 3 is an enlarged bottom plan view of the fuel assembly as seen along line 3—3 of FIG. 1.
Figure 4:
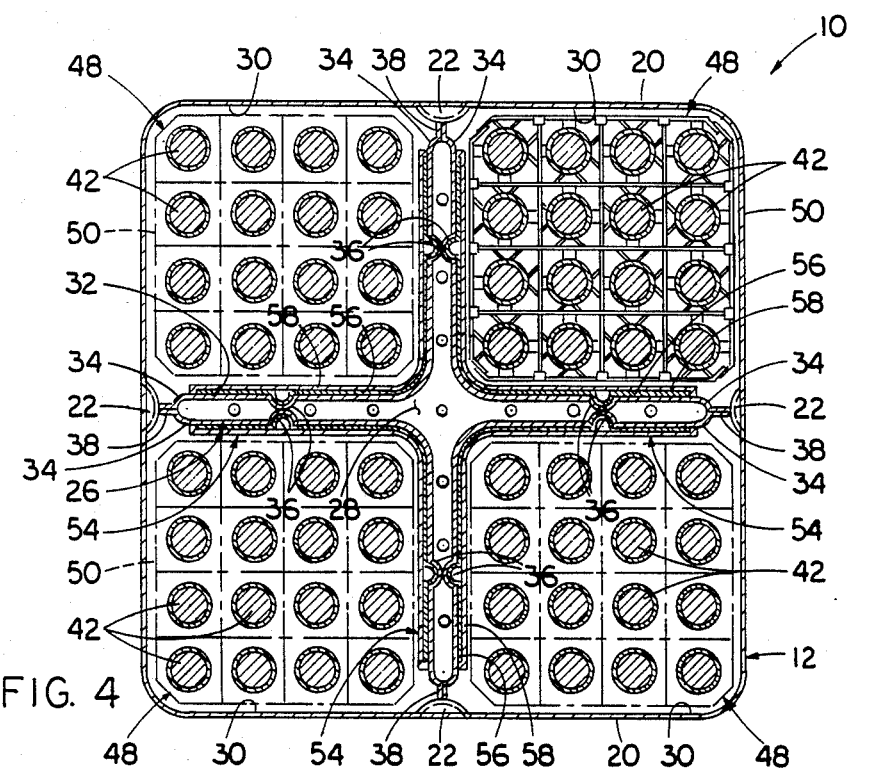
FIG. 4 is a cross-sectional view of the fuel assembly taken along line 4—4 of FIG. 1, showing the fuel rod bundle of the fuel assembly divided into separate mini-bundles by the water cross and also showing the fuel plates of the present invention attached on the exterior of the radial panels of the water cross.
Figure 5:
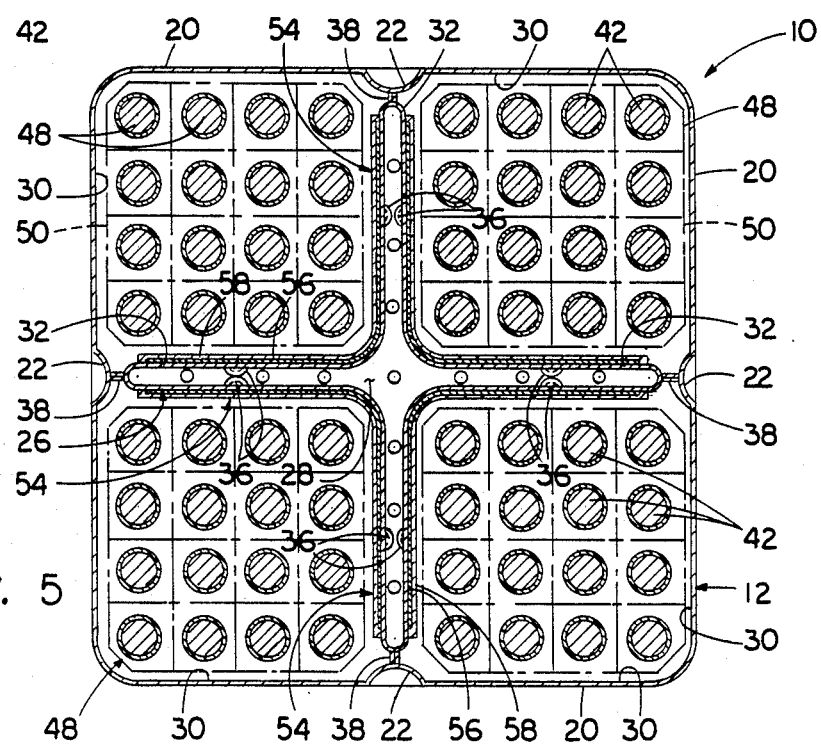
FIG. 5 is another cross-sectional view of the fuel assembly similar to that of FIG. 4, but taken along line 5—5 of FIG. 1.

Referring now to the drawings, and particularly to FIGS. 1 to 5, there is shown a nuclear fuel assembly, generally designated 10, for a BWR to which the improved features of the present invention are advantageously applied. The fuel assembly 10 includes an elongated outer tubular flow channel 12 that extends along substantially the entire length of the fuel assembly 10 and interconnects an upper support fixture or top nozzle 14 with a lower base or bottom nozzle 16. The bottom nozzle 16 which serves as an inlet for coolant flow into the outer channel 12 of the fuel assembly 10 includes a plurality of legs 18 for guiding the bottom nozzle 16 and the fuel assembly 10 into a reactor core support plate (not shown) or into fuel storage racks, for example in a spent fuel pool.

The outer flow channel 12 generally of rectangular cross-section is made up of four interconnected vertical walls 20 each being displaced about ninety degrees one from the next. Formed in a spaced apart relationship in, and extending in a vertical row at a central location along, the inner surface of each wall 20 of the outer flow channel 12, is a plurality of structural ribs 22. The outer flow channel 12, and thus the ribs 22 formed therein, are preferably formed of a metal material, such as an alloy of zirconium, commonly referred to as Zircaloy. Above the upper ends of the structural ribs 22, a plurality of upwardly-extending attachment studs 24 fixed on the walls 20 of the outer flow channel 12 are used to interconnect the top nozzle 14 to the channel 12.

For improving neutron moderation and economy, a hollow water cross, generally designated 26, extends axially through the outer channel 12 so as to provide an open inner channel 28 for subcooled moderator flow through the fuel assembly 10 and to divide the fuel assembly into four, separate, elongated compartments 30. The water cross 26 has a plurality of four radial panels 32 composed by a plurality of four, elongated, generally L-shaped, metal angles or sheet members 34 that extend generally along the entire length of the channel 12 and are interconnected and spaced apart by a series of elements in the form of dimples 36 formed in the sheet members 34 of each panel 32 and extending therebetween. The dimples 36 are provided in opposing pairs that contact each other along the lengths of the sheet members 34 to maintain the facing portions of the members in a proper spaced-apart relationship. The pairs of contacting dimples 36 are connected together such as by welding to ensure that the spacing between the sheet members 34 forming the panels 32 of the central water cross 26 is accurately maintained.

The hollow water cross 26 is mounted to the angularly-displaced walls 20 of the outer channel 12. Preferably, the outer, elongated longitudinal edges 38 of the panels 32 of the water cross 26 are connected such as by welding to the structural ribs 22 along the lengths thereof in order to securely retain the water cross 26 in its desired central position within the fuel assembly 10. Further, the inner ends of the panels together with the outer ends thereof define the inner central cruciform channel 28 which extends the axial length of the hollow water cross 26. Also, the water cross 26 has a lower flow inlet end 39 and an opposite upper flow outlet end 40 which each communicate with the inner channel 28 for providing subcoolant flow therethrough.

Disposed within the channel 12 is a bundle of fuel rods 42 which, in the illustrated embodiment, number sixty-four and form an 8×8 array. The fuel rod bundle is, in turn, separated into four mini-bundles thereof by the water cross 26. The fuel rods 42 of each mini-bundle, such being sixteen in number in a 4×4 array, extend in laterally spaced apart relationship between an upper tie plate 44 and a lower tie plate 46 and connected together with the tie plates comprise a separate fuel rod subassembly 48 within each of the compartments 30 of the channel 12. A plurality of grids or spacers 50 axially spaced along the fuel rods 42 of each fuel rod subassembly 48 maintain the fuel rods in their laterally spaced relationships. Coolant flow paths and cross-flow communication are provided between the fuel rod subassemblies 48 in the respective separate compartments 30 of the fuel assembly 10 by a plurality of openings 52 formed between each of the structural ribs 22 along the lengths thereof. Coolant flow through the openings 52 serves to equalize the hydraulic pressure between the four separate compartments 30, thereby minimizing the possibility of thermal hydrodynamic instability between the separate fuel rod subassemblies 48.

The above-described basic components of the BWR fuel assembly 10 are known in the prior art, except for modification of the Fuel rods 42 to comprise part of the hybrid fuel design of the present invention, as described hereinafter. The BWR fuel assembly 10, disclosed in greater detail in the patent to Barry et al cited above, has been discussed in sufficient detail herein to enable one skilled in the art to understand the hybrid fuel design of the present invention presented hereinafter. For a more detailed description of the construction of the BWR fuel assembly, attention is directed to the above-mentioned Barry et al patent.

Hybrid Fuel Design for Avoiding PCI Constraints and Failures

Figure 6:
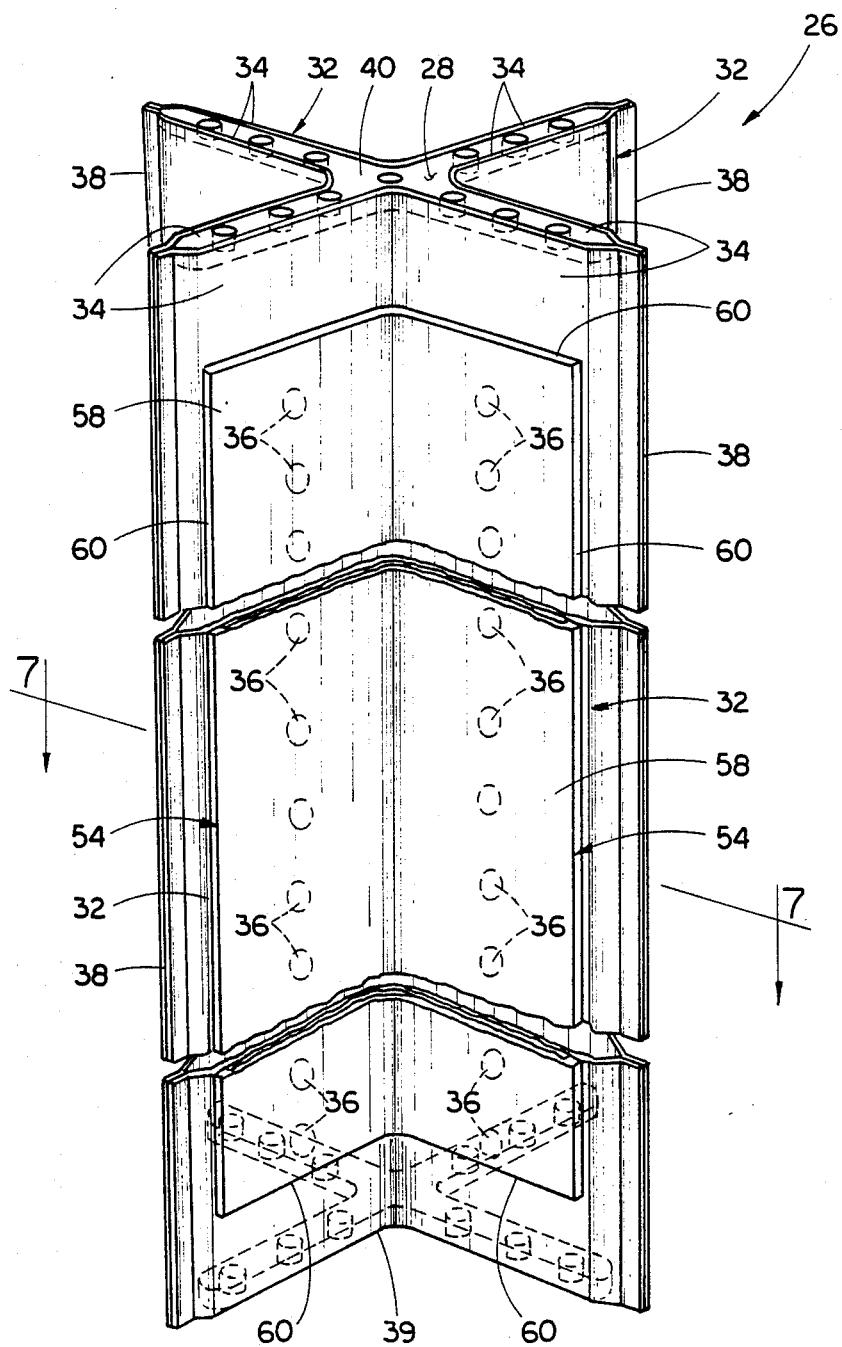
FIG. 6 is a perspective view, in vertically foreshortened form, of the water cross removed from the fuel assembly.
Figure 7:
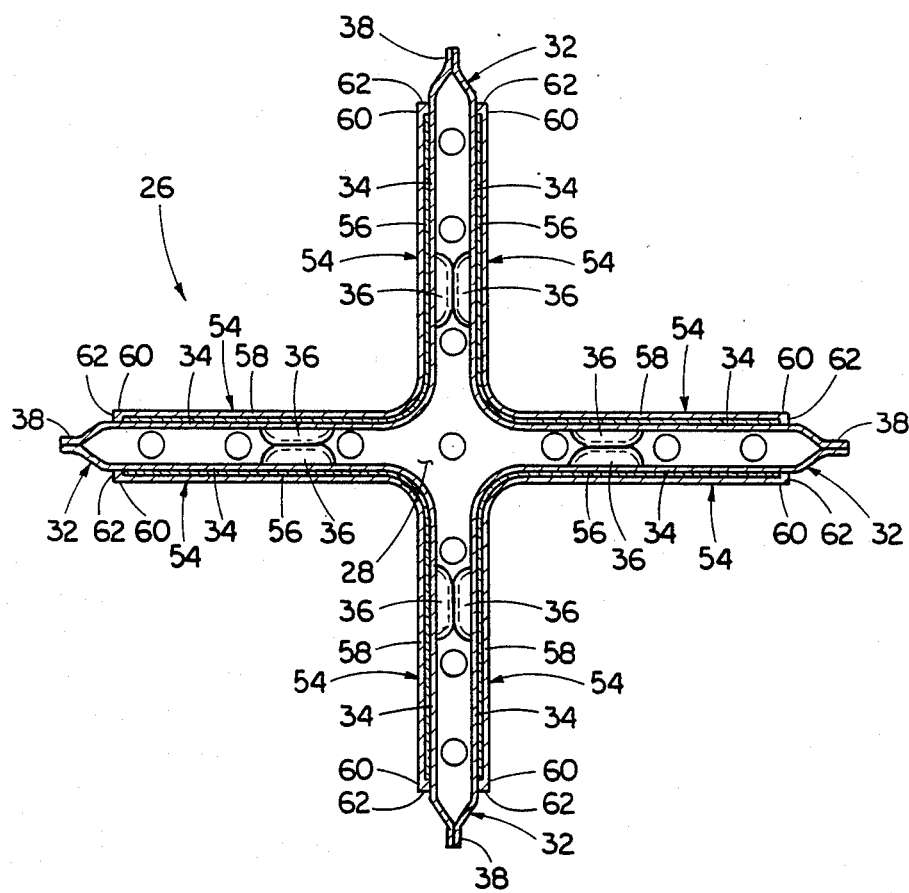
FIG. 7 is a cross-sectional view taken along line 7—7 of FIG. 6, showing the water cross and the fuel plates.

The present invention provides improved features in the form of a hybrid fuel design which minimizes PCI constraints and eliminates PCI failures. Referring to FIGS. 4–7, the hybrid fuel design comprises a cladded rod-type nuclear fuel in the form of the fuel rods 42 subdivided into the mini-bundles thereof being located within the compartments 30 and spaced transversely from both the walls 20 of the outer channel 12 and the radial panels 32 of the water cross 26, and a cladded plate-type nuclear fuel in the form of elongated fuel plates 54 respectively attached on the exterior of the radial panels 32 of the water cross 26. Power generation in the fuel assembly 10 is now distributed between the fuel rods 42 and fuel plates 54 such that there is reduced power generation per fuel rod/plate which minimizes PCI failures and avoids any nuclear/hydraulic stability problems. For example, power generation per fuel rod has been reduced approximately twenty percent from what it was heretofore, based on the twenty-five percent increase in heated perimeter.

More particularly, each fuel plate 54 attached on the exterior of a water cross radial panel 32 is, preferably, generally coextensive in length with the fuel rods 42. Also, preferably the fuel plate 54 is generally coextensive in width with the water cross panel 32 but shorter in length than the panel. Additionally, each fuel plate 54 includes an arcuate-shaped (right-angled) inner sheet 56 of nuclear fuel disposed adjacent the exterior of each of a pair of the water cross panels 32 and an arcuate-shaped (right-angled) outer sheet 58 of cladding disposed adjacent the exterior of the inner sheet 56. The outer sheet at its periphery 60 has an inwardly-turned rim 62 by which it is attached to the pair of water cross panels 32 so as to sealably encase or enclose the inner sheet 56 of nuclear fuel from contact with the flowing coolant/moderator liquid. The nuclear fuel of the inner sheet 56 can be the same composition as the nuclear fuel in pellet form in the fuel rods 42, for example, uranium oxide. The cladding of the outer sheet 58 can be the same composition as the cladding of the fuel rods 42, such as zirconium oxide, which also can be the composition of the water cross 26.

It is thought that the invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

I claim:

1. In a nuclear fuel assembly including an outer hollow tubular flow channel for directing the flow of coolant/moderator fluid through the fuel assembly and a hollow water cross extending through said channel and attached along the interior of said channel so as to divide it into plurality of separate compartments and provide a central hollow channel for flow of coolant/moderator fluid through the fuel assembly, a hybrid fuel design comprising:

(a) cladded rod-type nuclear fuel located within said compartments spaced from said outer channel and said water cross; and
(b) cladded plate-type thermally fissile nuclear fuel attached on the exterior of said water cross for distributing power generation between said cladded rod-type nuclear fuel and said water cross.

2. The fuel assembly as recited in claim 1, wherein said plate-type nuclear fuel is generally coextensive in length with said rod-type nuclear fuel.

3. The fuel assembly as recited in claim 1, wherein said plate-type nuclear fuel is generally coextensive in width with said water cross but shorter in length than said water cross.

4. In a nuclear fuel assembly including an outer hollow tubular flow channel providing an enclosure for directing the flow of coolant/moderator fluid through the fuel assembly and a water cross extending through said channel and having a plurality of radially extending members attached along the interior of said channel and dividing it into a plurality of separate compartments, a hybrid fuel design comprising:

(a) a plurality of elongated fuel rods located within said compartments between the interior of said outer flow channel and exterior of said radially extending members of said water cross; and
(b) a plurality of elongated thermally fissile fuel plates attached on the exterior of said water cross members.

5. The fuel assembly as recited in claim 4, wherein said fuel plates are generally coextensive in length with said fuel rods.

6. The fuel assembly as recited in claim 4, wherein said fuel plates are generally coextensive in width with said water cross members but shorter in length than said water cross members.

7. The fuel assembly as recited in claim 4, wherein each fuel plate includes:
an inner sheet of nuclear fuel disposed adjacent the exterior of each of said water cross members; and
an outer sheet of cladding disposed adjacent the exterior of said inner sheet and having a periphery attached to said water cross members so as to sealably enclose said inner sheet of nuclear fuel.

8. In a fuel assembly, the combination comprising:
(a) an array of spaced fuel rods;
(b) an outer hollow tubular flow channel surrounding said fuel rods so as to direct flow of coolant/moderator fluid therealong;
(c) a water cross extending through said channel and having a plurality of radially extending panels dividing said array of fuel rods into a plurality of separate fuel rod mini-bundles; and
(d) a plurality of thermally fissile fuel plates respectively attached on the exterior of said water cross panels.

9. The fuel assembly as recited in claim 8, wherein each fuel plate includes:
an inner sheet of nuclear fuel disposed adjacent the exterior of each of said water cross panels; and
an outer sheet of cladding disposed adjacent the exterior of said inner sheet and having a periphery attached to said water cross panels so as to sealably enclose said inner sheet of nuclear fuel.

10. The fuel assembly as recited in claim 8, wherein said fuel plates are generally coextensive in length with said fuel rods.

11. The fuel assembly as recited in claim 8, wherein said fuel plates are generally coextensive in width with said water cross panels but shorter in length than said water cross panels.

12. The fuel assembly as recited in claim 1 wherein said plate-type thermally fissile nuclear fuel is curved for following the contour of said exterior of said water cross.

13. The fuel assembly as recited in claim 4, wherein said thermally fissile fuel plates are curved for following the contour of said exterior of said water cross members.

14. The fuel assembly as recited in claim 8, wherein said thermally fissile fuel plates are curved for following the contour of said exterior of said water cross panels.

* * * * *